(12) United States Patent
Zhang

(10) Patent No.: US 11,220,007 B2
(45) Date of Patent: Jan. 11, 2022

(54) METHOD OF STACKING GOODS BY ROBOT, SYSTEM OF CONTROLLING ROBOT TO STACK GOODS, AND ROBOT

(71) Applicant: SHENZHEN DORABOT ROBOTICS CO., LTD., Shenzhen (CN)

(72) Inventor: Hao Zhang, Shenzhen (CN)

(73) Assignee: SHENZHEN DORABOT ROBOTICS CO., LTD., Shenzhen (CN)

( * ) Notice: Subject to any disclaimer, the term of this patent is extended or adjusted under 35 U.S.C. 154(b) by 525 days.

(21) Appl. No.: 16/305,996

(22) PCT Filed: Aug. 23, 2017

(86) PCT No.: PCT/CN2017/098614
§ 371 (c)(1),
(2) Date: Nov. 30, 2018

(87) PCT Pub. No.: WO2019/036929
PCT Pub. Date: Feb. 28, 2019

(65) Prior Publication Data
US 2021/0229285 A1 Jul. 29, 2021

(51) Int. Cl.
*B25J 9/16* (2006.01)
*B25J 9/00* (2006.01)
(Continued)

(52) U.S. Cl.
CPC ........... *B25J 9/1687* (2013.01); *B25J 9/0093* (2013.01); *B25J 9/1676* (2013.01); *B65G 60/00* (2013.01);
(Continued)

(58) Field of Classification Search
CPC ........ G06Q 10/043; G06Q 50/28; B65B 5/00; B65B 35/00; B65G 1/0464; B65G 1/1373; B65G 57/00; B65G 61/00; G06T 7/0042; G06T 7/73; G06T 2207/10004; G05B 2219/40006; G05B 2219/45056; Y10S 414/116
See application file for complete search history.

(56) References Cited

U.S. PATENT DOCUMENTS

| 4,287,459 A | * | 9/1981 | Dahlstrom | ......... G05B 19/4182 |
| | | | | 318/568.14 |
| 4,692,876 A | * | 9/1987 | Tenma | ................ B65G 1/1371 |
| | | | | 414/791.6 |
| 5,501,571 A | * | 3/1996 | Van Durrett | ....... G05B 19/4189 |
| | | | | 414/801 |

(Continued)

*Primary Examiner* — Gregory W Adams
(74) *Attorney, Agent, or Firm* — WPAT, PC

(57) ABSTRACT

A method of stacking goods by a robot, a system of controlling the robot to stack the goods, and the robot are provided in the field of robot control. The method includes: acquiring a current pose and a target pose of the goods; obtaining a collision-free motion trajectory of the robot and/or an end effector of the robot based on the current pose and the target pose of the goods; and controlling the robot to place the goods in the target pose in accordance with the collision-free motion trajectory. The method of stacking goods by the robot, the system of controlling the robot to stack the goods, and the robot are configured to realize a process of fully automated stacking the goods in the scenario of logistically loading or unloading the goods. The efficiency of loading or unloading the goods can be improved, and the labor cost can be reduced.

20 Claims, 4 Drawing Sheets

(51) Int. Cl.
*B65G 60/00* (2006.01)
*G01G 19/00* (2006.01)
*G05B 19/4155* (2006.01)
*G06K 7/14* (2006.01)

(52) U.S. Cl.
CPC ......... *G01G 19/00* (2013.01); *G05B 19/4155* (2013.01); *G06K 7/1417* (2013.01); *G05B 2219/50391* (2013.01)

(56) References Cited

U.S. PATENT DOCUMENTS

| | | | | |
|---|---|---|---|---|
| 7,210,894 B2 * | 5/2007 | Huang | ................... | B65G 47/90 414/21 |
| 7,627,394 B2 * | 12/2009 | Volcic | ................... | B25J 9/1664 318/567 |
| 8,290,617 B2 * | 10/2012 | Ruge | ....................... | B65G 61/00 700/245 |
| 8,326,460 B2 * | 12/2012 | Ban | ......................... | B25J 9/1697 700/259 |
| 8,489,229 B2 * | 7/2013 | Kuehnemann | .......... | G06Q 10/08 700/217 |
| 8,779,715 B2 * | 7/2014 | Kassow | ................. | B25J 9/1671 318/568.2 |
| 9,043,023 B2 * | 5/2015 | Noro | ..................... | B25J 9/1664 700/249 |
| 2007/0276539 A1 * | 11/2007 | Habibi | ................... | B25J 9/1697 700/245 |
| 2013/0110280 A1 * | 5/2013 | Folk | ....................... | B25J 9/1697 700/215 |
| 2014/0154036 A1 * | 6/2014 | Mattern | ................. | B25J 9/0084 414/729 |
| 2014/0277694 A1 * | 9/2014 | Ichimaru | ................ | B25J 9/1612 700/218 |
| 2015/0130592 A1 * | 5/2015 | Lakshminarayanan | ..................... | B65G 67/20 340/10.1 |
| 2016/0075521 A1 * | 3/2016 | Puchwein | ............ | B65G 1/1378 700/218 |
| 2016/0167227 A1 * | 6/2016 | Wellman | ................ | B25J 9/1612 700/259 |
| 2016/0229062 A1 * | 8/2016 | Suzuki | .................. | B25J 9/1697 700/259 |

* cited by examiner

METHOD OF STACKING GOODS BY ROBOT, SYSTEM OF CONTROLLING ROBOT TO STACK GOODS, AND ROBOT

CROSS REFERENCE TO RELATED APPLICATIONS

This application is a national stage filing under section 371 of International Application No. PCT/CN2017/098614 filed on Aug. 23th, 2017, which are hereby incorporated by reference herein in their entirely.

FIELD OF THE INVENTION

The present invention relates to the technology of robot control. More particularly, the present invention relates to a method of stacking goods by a robot, a system of controlling the robot to stack goods, and the robot.

BACKGROUND OF THE INVENTION

Along with the development of robotic technology, workers are gradually being replaced by machines in various fields and industries. However, in the logistic business, a massive amount of human labor power is still required to transport the goods in many situations. While loading and unloading the goods, workers are still needed. During the loading or unloading process, the goods of different sizes are stacked orderly and manually by many workers based on their practical experience. The process is time consuming, inefficient, and requiring a large amount of labor cost. In addition, such labor-intensive work environment induces a higher chance of injuries.

SUMMARY OF THE INVENTION

In view of the above-mentioned problems, the present invention is to provide a method of stacking goods, a system of controlling a robot to stack goods, and a robot, so that a process of fully automated stacking the goods can be realized in the scenario of logistically loading or unloading the goods. The efficiency of loading or unloading the goods can be improved, and the labor cost can be reduced.

According to a first aspect of the embodiment of the invention, a method of stacking goods by a robot is provided. The method includes the following steps: acquiring a current pose and a target pose of the goods; obtaining a collision-free motion trajectory of the robot and/or an end effector of the robot based on the current pose and the target pose of the goods; and controlling the robot to place the goods in the target pose in accordance with the collision-free motion trajectory.

According to a second aspect of the embodiment of the invention, a robot is provided. The robot includes a storage device, a processing device, and a computer program. The computer program is stored in the storage device and is executable by the processing device to perform the method of stacking the goods by the robot according to the first aspect of the invention.

According to a third aspect of the embodiment of the invention, a system of controlling a robot to stack goods is provided. The system includes a server, a conveyer device, and the robot. The server is configured to transmit a scheduling instruction to the robot. The conveyer device is configured to convey the goods. The robot is configured to perform each step in the method of stacking the goods by the robot according to the first aspect of the invention.

In the embodiments of the invention described in the above disclosure, the collision-free motion trajectory of the robot and/or the end effector of the robot is planned based on the current pose and the target pose of the goods. The goods are moved to the target pose in accordance with the collision-free motion trajectory. The process of fully automated stacking the goods can be realized in the scenario of logistically loading or unloading the goods, and the efficiency of loading or unloading the goods can be improved, and the labor cost can be reduced.

BRIEF DESCRIPTION OF DRAWINGS

The invention can be more fully understood by reading the following detailed description of the embodiment, with reference made to the accompanying drawings as follows.

DETAILED DESCRIPTION

The embodiments of the invention will be elaborated below with accompanying drawings to clearly show and to provide better understanding of the objects, the features, and the advantages of the invention. It will be apparent that the embodiments described herein merely show a part of the embodiments of the invention, not all the embodiments of the invention. All other embodiments made by persons skilled in the art without undue experimentations are within the scope or spirit of the present invention.

Figure 1:
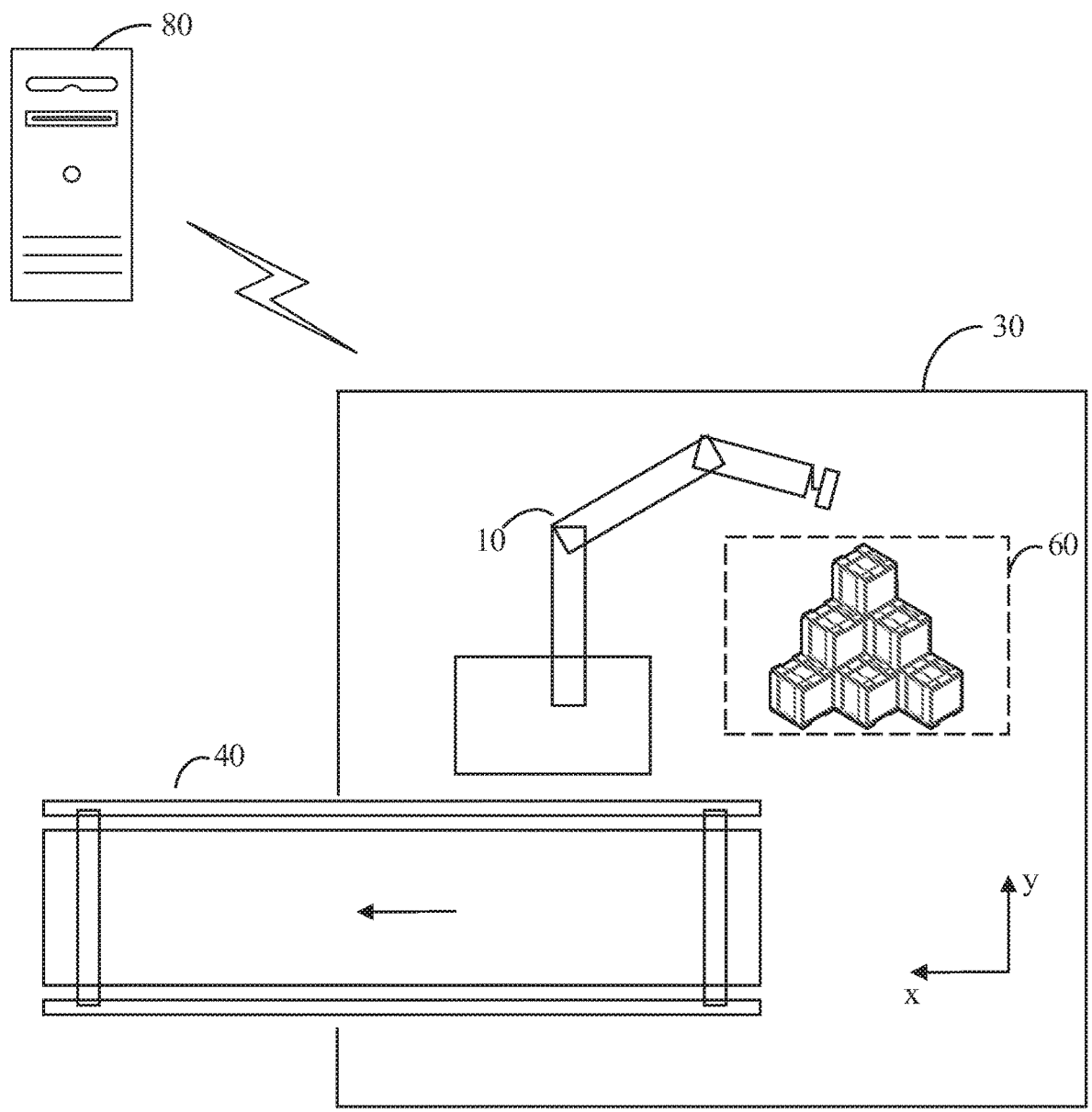
FIG. 1 is a schematic diagram showing an implemented environment of a method of stacking goods by a robot according to one embodiment of the invention.

Please refer to FIG. 1, which is a schematic diagram showing an implemented environment of a method of stacking goods by a robot according to one embodiment of the invention. As shown in FIG. 1, the robot 10 exchanges data with a server 80 via a wired or a wireless connection. The robot 10 performs loading or unloading process of goods based on instructions sent by the server 80, such as loading the goods into a compartment 30 from the outside of the compartment 30 or a conveyer device 40; or unloading the goods 60 to the conveyer device 40 or to the outside of the compartment 30 from the compartment 30. The robot 10 can be a single robot or a group of robots.

Figure 2:
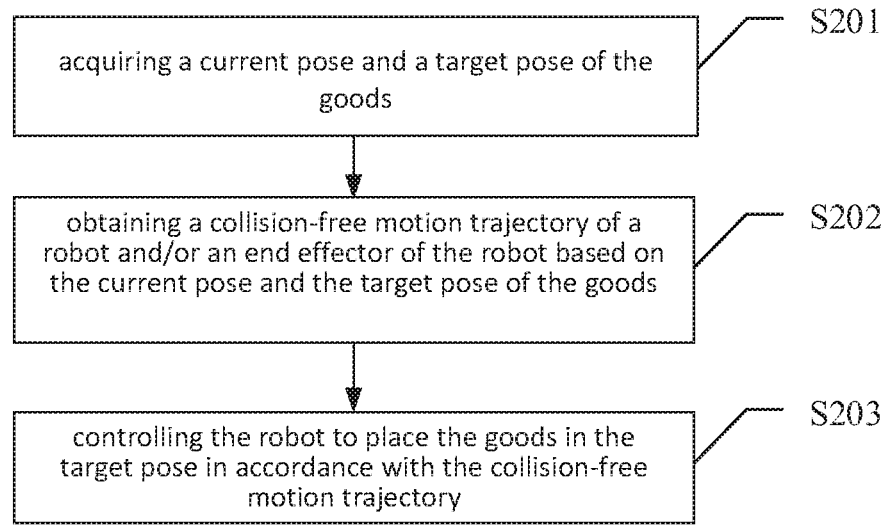
FIG. 2 is a flow chart of a method of stacking goods by a robot according to a first embodiment of the invention.

Please refer to FIG. 2, which is a flow chart of a method of stacking goods by a robot according to a first embodiment of the invention. The method can be applied to the operation of stacking the goods by controlling the robot. The operation of stacking the goods includes loading the goods (i.e. stacking the goods into the compartment from the outside of the compartment or the conveyer device) and unloading the goods (i.e. stacking the goods to the conveyer device or to the outside of the compartment from the compartment). Each step of the embodiment can be performed by a robot or a control module. When the method is performed by the control module, the control module can be disposed in the robot, a server, or other computing terminals. As shown in FIG. 2, the method mainly includes the following steps.

Step S201, a current pose and a target pose of the goods are acquired.

The pose includes the posture and the location. In certain scenarios, the postures of all the objects are consistent. When an end effector of the robot uses a self-adaptive suction disc, the posture parameter can be disregarded in the pose information, and only the location parameter is included. The current pose and the target pose of the goods can be known poses, or they can be acquired by analyzing the on-site pictures in the compartment, or they can also be acquired via the server. While unloading, the current pose includes a pose of the goods to be unloaded which is stacked in the compartment. The target pose includes a pose of the goods to be unloaded which is to be move from the compartment to outside the compartment such as conveying the goods out of the compartment via the conveyer device which is extended into the compartment. The target pose can also be other poses where the robot receives the goods, and the goods can be conveyed out of the compartment by a mobile robot. While loading the current pose includes a pose of the goods to be loaded, and the target pose includes a placing pose of the goods to be loaded in the compartment.

Step S202, a collision-free motion trajectory of the robot and/or the end effector of the robot is obtained based on both the current pose and the target pose of the goods.

In the present embodiment, the operation of stacking the goods can be performed by an armless robot, e.g. a forklift robot. The armless robot can move to a designated location based on a scheduling instruction sent by the server or other terminals (such as other robots, mobile phones, or other mobile devices). The armless robot can move in four directions of ascent, descent, expand, and contract while commencing the operation. In another embodiment, the operation of stacking the goods can be performed by a robotic arm having the end effector. The robotic arm can be placed at the exit of the compartment or at the location of the connecting mechanism. Or, the operation of stacking the goods can be performed by a mobile robot including a chassis and a robotic arm attached with the end effector. The collision-free motion trajectory includes a motion trajectory of the chassis and a motion trajectory of the end effector. The motion trajectories include a motion path and a speed of the motion. The compartment includes a cabin of a land transportation vehicle and a trailer, in addition, it can also include containers. By loading the containers onto vehicles, ships, or airplanes, the land, marine, or air transportation of the goods can be realized.

The collision-free motion trajectory is a trajectory that does not interfere with the obstacles in the surroundings.

Step S203, the goods are placed in the target position by controlling the robot in accordance with the collision-free motion trajectory.

The goods to be stacked are stacked in the target pose by the robot and/or by the end effector according to the planned collision-free motion trajectory.

In the present embodiment of the invention, the collision-free trajectory of the robot and/or the end effector is planned based on both the current pose and the target pose of the goods. The goods are stacked to the target pose based on the collision-free motion trajectory, so a process of fully automated stacking the goods based on the robot can be realized in the scenario of logistically loading or unloading the goods. As a result, the efficiency of loading or unloading the goods can be improved, and the labor cost can be reduced.

Figure 3:
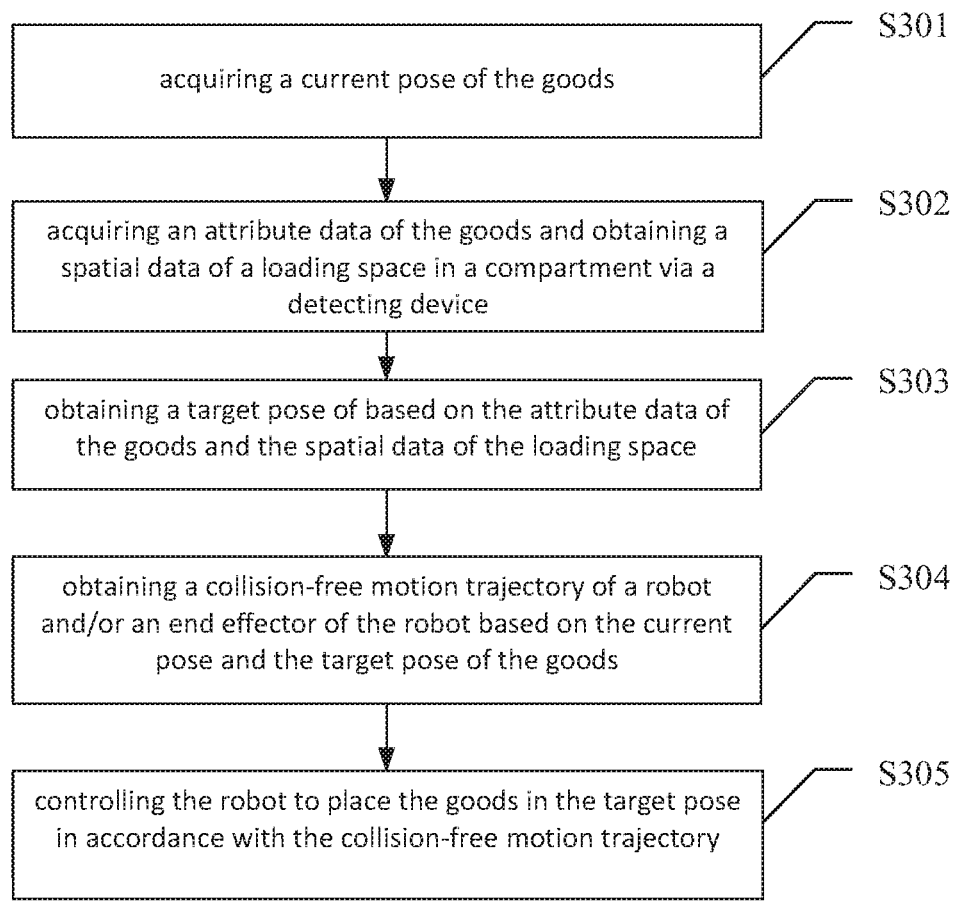
FIG. 3 is a flow chart of a method of stacking goods by a robot according to a second embodiment of the invention.

Please refer to FIG. 3, which is a flow chart of a method of stacking goods by a robot according to a second embodiment of the invention. The method can be applied to the operation of stacking the goods by controlling the robot. Each step of the embodiment can be performed by a robot or a control module. When the method is performed by the control module, the control module can be disposed in the robot, a server, or other computing terminals. As shown in FIG. 3, the method mainly includes the following steps.

Step S301, a current pose of the goods is acquired.

In the present embodiment, the robot moves to a compartment as instructed in a scheduling instruction and commences the operation of stacking the goods in response to the scheduling instruction. The compartment includes a cabin of a land transportation vehicle and a trailer, in addition, it can also include containers. By loading the containers onto vehicles, ships, or airplanes, the land, marine, or air transportation of the goods can be realized. The scheduling instruction can be sent by the server, or by other robots in the system, or alternatively by other terminals such as mobile control devices including mobile phones.

The pose includes the posture and the location of the goods. In certain scenarios, the postures of all the goods are consistent. When the end effector of the robot uses a self-adaptive suction disc, the posture parameter can be disregarded in the pose information, and only the location parameter is included.

The current pose of the goods can be acquired in advance before commencing the operation of stacking the goods. The current pose of the goods can be pre-determined pose, or it can be acquired by analyzing the on-site pictures in the compartment. In the present embodiment, the objects of the operation of stacking the goods are the goods to be loaded on the conveyer device or in a warehouse.

Step S302, an attribute data of the goods is acquired, and a spatial data of a loading space in the compartment is obtained via a detecting device.

The attribute data of the goods includes any one or more combination of volume, weight, color, shape, and pattern of the goods.

The detecting device can include one or more combination of a scanning device, a visual sensor, an RGB depth sensor, and an IR sensor. The scanning device can be exemplified by a camera, a scanner, or other devices that can identify specific patterns. The specific patterns include tags like barcode, QR code, and can further include the patterns representing the exterior texture or color of the goods. The detecting device can be disposed on the conveyer device, the robotic arm of the robot, the end effector at the end of the robotic arm, or the inner wall of the compartment. The number of the detecting device can be at least one according to practical needs. When multiple detecting devices are used, an on-site data in the compartment and the attribute data of the goods to be stacked can be respectively acquired. For example, one visual sensor and one scanning device can be disposed in the compartment, and the visual sensor is configured to acquire the on-site data in the compartment and the scanning device is configured to acquire the attribute data of the goods to be stacked via scanning the tag on the goods.

The loading space in the compartment indicates the space that has not been occupied and can be used to place the goods. The spatial data can vary depending on different description methods. For example, a spatial description method can be implemented, which includes a voxel that can be used to show a fundamental display unit in a three-dimensional space. In another example, a planar description can be implemented as well, which includes a mesh that can be used to describe a three-dimensional space or object by using a closed curved plane. The goods and the spatial data can be implemented with different description methods, so long as the disposition relation of the goods can be matched in the space through the description information. The spatial data can include a coordinate information that can be transferred into a coordinate in a world coordinate system. The world coordinate system is utilized so that the coordinate systems used by the devices or sub-systems in the system, such as the one used by the robot to move the chassis and the one used by the end effector, can all be transferred into the world coordinate system. Practically, the coordinate system used by the detecting device can be used as the world coordinate system, and the coordinate system used in the compartment can also be used as the world coordinate system, so long as all the different coordinate systems can be mirrored to the same world coordinate system.

Optionally, the attribute data of the goods can be obtained from the server by scanning the tag of the goods. Practically, the tag on the goods is scanned to get a data associated with the tag. The data associated with the tag includes an identification of the goods. Then, the identification of the goods is transmitted to the server, and the server searches for the attribute data corresponding to the identification of the goods. The scanning of the tag of the goods includes identifying the tag via an image data obtained from the spatial data acquired by the visual sensor.

Optionally, the attribute data of the goods can be obtained locally by scanning the tag of the goods. Practically, the tag on the goods is scanned to get the data associated with the tag. The data associated with the tag includes the identification of the goods. Then, the attribute data corresponding to the identification of the goods is searched among all the attribute data of the goods.

Further, all the attribute data of the goods can be acquired from the server and stored in advance.

Optionally, the attribute data of the goods is obtained via a data acquired by a weighing device and/or the detecting device. For example, the attribute data of the goods can be stored in the tag. The attribute data of the goods can be acquired by scanning the tag of the goods. Alternatively, a weight data can be acquired by the weighing device, and the data relating to volume, color, and shape of the goods can be acquired by the visual sensor.

Optionally, the specific implementation of acquiring the spatial data of the loading space in the compartment via the detecting device includes the following two examples.

In the first example, the spatial data of the loading space can be obtained via the on-site data transmitted by the detecting device. The on-site data in the compartment includes the pictures or images of the working environment of the compartment. Exemplarily, the detecting device includes a two-dimensional camera combined with a depth detecting device, such that a two-dimensional image and a depth data can be acquired to provide the spatial data. In this manner, the detecting device is configured to acquire the on-site data in the compartment and send it to the robot or the server.

In the second example, the spatial data of the loading space can be obtained by means of receiving the spatial data transmitted from the detecting device based on the detected on-site data in the compartment. In this manner, the detecting device not only acquires the on-site data in the compartment but also analyzes the on-site data to obtain the spatial data of the loading area.

Step S303, the target pose of the goods is obtained based on the attribute data of the goods and the spatial data of the loading space.

The attribute data includes but not limited to any one or more combination of volume, weight, color, and pattern.

The pose of the goods includes the posture and the location of the goods. In certain scenarios, the postures of all the goods are consistent. When the end effector of the robot uses the self-adaptive suction disc, the posture parameter can be disregarded, and only the location parameter is included in the pose information. The target pose of the goods indicates the location for the goods to be stacked and how the goods should be posed.

Optionally, in another embodiment of the invention, the target pose of the goods can be obtained via the server. Practically, the tag of the goods is scanned by the detecting device to get the data associated with the. The data associated with the tag includes the identification of the goods. Then the identification of the goods is sent to the server, and the server searches for the attribute data corresponding to the identification based on the identification of the goods. The target pose of the goods is then acquired by the server based on the attribute data, the on-site data in the compartment, or the spatial data of the loading space in the compartment transmitted by the detecting device. The target pose of the goods is returned from the server.

Optionally, in yet another embodiment of the invention, the target pose of the goods can be determined by the server in advance, and each target pose is assigned with a serial number. The server transmits the serial numbers of the goods to the robot according to a stacking order of the goods and controls the conveyer device to convey the goods to be stacked into the compartment according to the stacking order. The robot receives the serial number of the target pose sent from the server and searches for the corresponding target pose relating to the acquired serial number in a pre-determined document defining the correlation between the serial numbers and the target poses. In another embodiment, a string of serial numbers representing all the target poses of the goods to be stacked is transmitted to the robots that perform the operations of stacking the goods. The string of serial numbers includes a series of numbers arranged in an order planned by the server. One robot receives the string of serial numbers, and the goods to be stacked are conveyed into the corresponding compartment via the conveyer device based on the planned order. Another robot obtains the target pose of a first goods to be stacked based on a first serial number in the string of serial numbers. It is to be understood that the serial numbers can straightly be the target poses, or other form of data that correlated to the target poses.

Step S304, a collision-free motion trajectory of the robot and/or an end effector of the robot is obtained based on the current pose and the target pose of the goods.

In the present embodiment, the operation of stacking the goods can be performed by an armless robot, e.g. a forklift robot. The armless robot can move to a designated location and can move in four directions of ascent, descent, expand, and contract while commencing the operation. In another embodiment, the operation of stacking the goods can be performed by a robotic arm having an end effector. The robotic arm can be placed at the exit of the compartment or at the location of the connecting mechanism. Or, in yet another embodiment, the operation of stacking the goods can be performed by a mobile robot including a chassis and a robotic arm attached with the end effector. The collision-free motion trajectory includes a motion path of the chassis and a motion path of the end effector.

Further, the data of the obstacles around is considered while planning the collision-free motion trajectory. Practically, the collision-free motion trajectory is obtained based on the current pose and the target pose of the goods and the data of the obstacles around. The data of the obstacles around includes but not limited to the shape and location of the obstacle around obtained by the visual sensor.

The collision-free motion trajectory is a trajectory that does not interfere with the obstacles in the surroundings.

Step S305, the goods are placed in the target pose by controlling the robot in accordance with the collision-free motion trajectory.

The goods are positioned and stacked in the target location by the robot and/or by the end effector that moves along the planned collision-free motion trajectory.

In the present embodiment of the invention, the collision-free trajectory of the robot and/or the end effector is planned based on the current pose and the target pose of the goods to be loaded. The goods are stacked to the target pose based on the collision-free motion trajectory, so a process of fully automated stacking the goods base on the robot can be realized in the scenario of logistically loading or unloading the goods. As a result, the efficiency of loading or unloading the goods can be improved, and the labor cost can be reduced.

Figure 4:
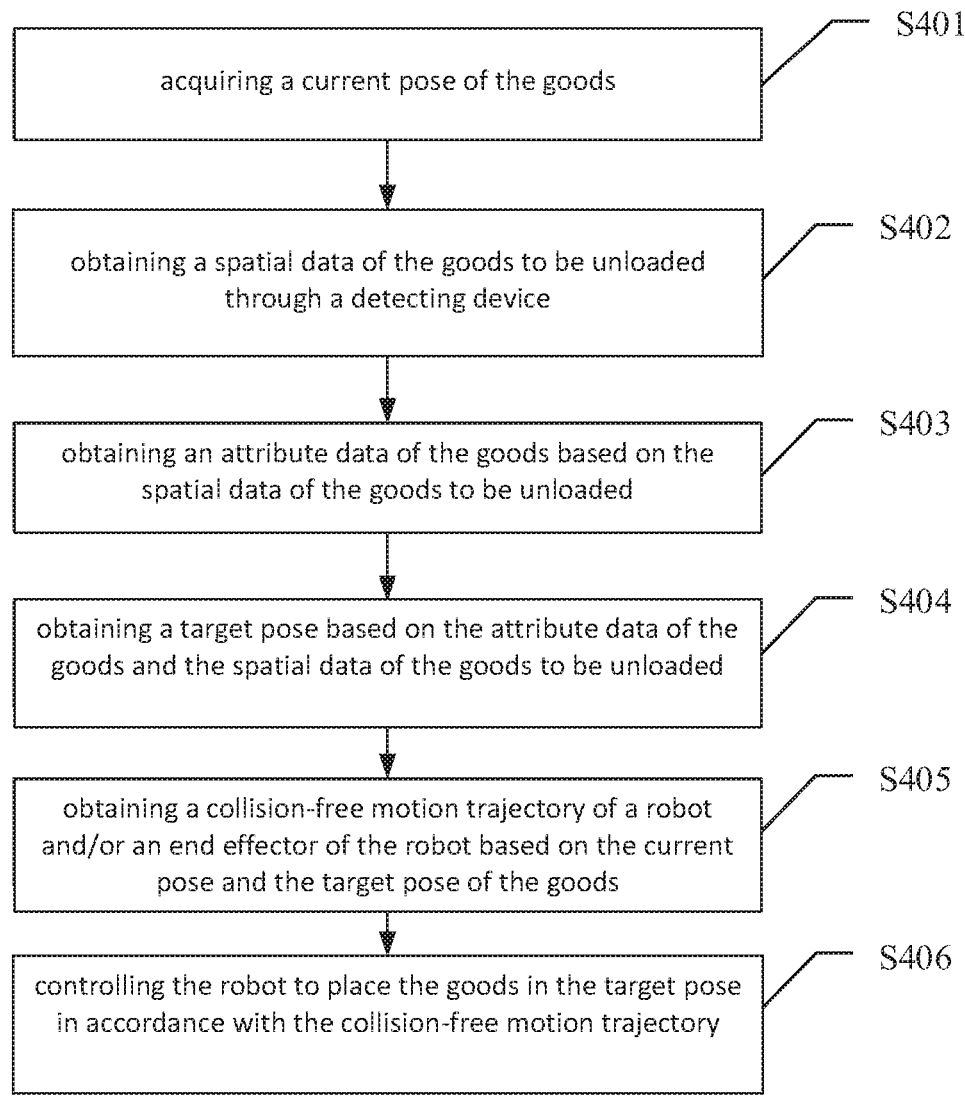
FIG. 4 is a flow chart of a method of stacking goods by a robot according to a third embodiment of the invention.

Please refer to FIG. 4, which is a flow chart of a method of stacking goods by a robot according to a third embodiment of the invention. The method can be applied to the operation of stacking the goods by controlling the robot. Each step of the embodiment can be performed by a robot or a control module. When the method is performed by the control module, the control module can be disposed in the robot, a server, or other computing terminals. As shown in FIG. 4, the method mainly includes the following steps.

Step S401, a current pose of the goods is acquired.

In the present embodiment, the robot moves into a compartment as instructed in a scheduling instruction and commences the operation of stacking the goods in response to the scheduling instruction. The compartment includes a cabin of a land transportation vehicle, a trailer, and containers. By loading the containers onto vehicles, ships, or airplanes, the land, marine, or air transportation of the goods can be realized. The scheduling instruction can be sent by the server, or other robots in the system, or alternatively other terminals such as mobile control devices including mobile phones.

The pose includes the posture and the location of the goods. In certain scenarios, the postures of all the goods are consistent. When an end effector of the robot uses a self-adaptive suction disc, the posture parameter can be disregarded in the pose information, and only the location parameter is considered in the pose information. The current pose of the goods can be acquired in advance before stacking the goods. The current pose of the goods can be pre-determined pose, or it can be acquired by analyzing the on-site pictures in the compartment. In the present embodiment, the objects of the stacking operation are the goods to be unloaded in the compartment.

Step S402, a spatial data of the goods to be unloaded in the compartment is obtained via a detecting device.

The detecting device includes one or more combination of a scanning device, a visual sensor, an RGB depth sensor, and an IR sensor. The scanning device can be exemplified by a camera, a scanner, or other devices that can identify specific patterns. The specific patterns include tags like barcode, QR code, and further include the patterns representing the exterior texture or color of the goods. The detecting device can be disposed on the conveyer device, the robotic arm of the robot, the end effector at the end of the robotic arm, or the inner wall of the compartment. According to actual needs, the number of the detecting device is no less than one.

When more than one detecting devices are used, the on-site data in the compartment and the attribute data of the goods to be stacked can be respectively acquired. For example, one visual sensor and one scanning device can be disposed in the compartment. The on-site data in the compartment is acquired by the visual sensor, and the attribute data of the goods to be stacked is acquired by the scanning device via scanning the tag on the goods.

The spatial data of the goods to be unloaded in the compartment indicates the space in the compartment that has been occupied by the goods. The spatial data could be different according to different description methods. For example, a spatial description method can be implemented, which includes a voxel that can be used to show a fundamental display unit in a three-dimensional space. In another example, a planar description can be implemented as well, which includes a mesh that can be used to describe a three-dimensional space or object by using a closed curved plane. The goods and the spatial data can be implemented with different description methods, if the disposition relation of the goods in the space can be shown via the description information. The spatial data can include a coordinate information that can be transferred into a coordinate in a world coordinate system. The devices or sub-systems such as the coordinate system of moving the chassis of the robot and the coordinate system used by the end effector can all be transferred into the world coordinate system. Specifically, the coordinate system used by the detecting device can be used as the world coordinate system, and the coordinate system used in the compartment can also be used as the world coordinate system, so long as all the different coordinate systems can be mirrored to the same world coordinate system.

Step S403, the attribute data of the goods is acquired based on the spatial data of the goods to be unloaded.

Practically, the spatial data of the goods to be unloaded can be obtained based on the on-site data in the compartment transmitted by the detecting device. Or the spatial data of the goods to be unloaded can be received from the detecting device according to the detected on-site data in the compartment.

Step S404, the target pose is obtained based on the attribute data of the goods and the spatial data of the goods to be unloaded.

Practically, the spatial data of the goods to be unloaded can be obtained by an overall visual sensor. Then, the target pose of the goods can be obtained based on the attribute data of the goods. The target pose can be a holding pose and can also be a target location and/or pose, such as the location and/or posture of disposing on the conveyer device, the location and/or posture of conveying to other robots, or the location and/or posture of a loading area.

The attribute data of the goods includes any one or more combinations of volume, weight, color, and pattern.

Step S405, a collision-free motion trajectory of the robot and/or the end effector of the robot is obtained based on the current pose and the target pose of the goods.

Step S406, the goods are placed in the target pose by controlling the robot in accordance with the collision-free motion trajectory.

The contents of step S405 and S406 can refer to the second embodiment shown in FIG. 3 and will not be repeated here.

In the embodiments of the invention, the collision-free motion trajectory of the robot and/or the end effector of the robot is planned based on the current pose and the target pose of the goods to be unloaded in the compartment. Then the goods are stacked in the target pose in accordance with the collision-free motion trajectory. The process of fully automated stacking the goods can be realized in the scenario of logistically unloading the goods, and the efficiency of unloading the goods can be improved, and the labor cost can be reduced.

Figure 5:
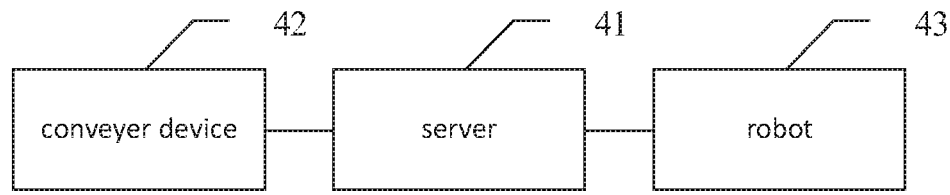
FIG. 5 is a schematic diagram showing a structure of a system of controlling a robot to stack goods according to a fourth embodiment of the invention.

Please refer to FIG. 5, which is a schematic diagram showing a structure of a system of controlling a robot to stack goods according to the fourth embodiment of the invention. The system includes a server 41, a conveyer device 42, and a robot 43, as shown in FIG. 5.

The server 41 is configured to transmit a scheduling instruction to the robot 43. The conveyer device 42 is configured to convey the goods. The robot 43 is configured to perform each step in the method of stacking the goods by the robot according to the first to the third embodiments as mentioned above.

Other technical details of the present embodiment can refer to the methods as described in the first to the third embodiments of the invention.

In the present embodiment of the invention, the collision-free motion trajectory of the robot and/or the end effector of the robot is planned based on the current pose and the target pose of the goods. The goods are moved to the target pose in accordance with the collision-free motion trajectory. The process of fully automated stacking the goods can be realized in the scenario of logistically loading or unloading the goods, and the efficiency of loading or unloading the goods can be improved, and the labor cost can be reduced.

Figure 6:
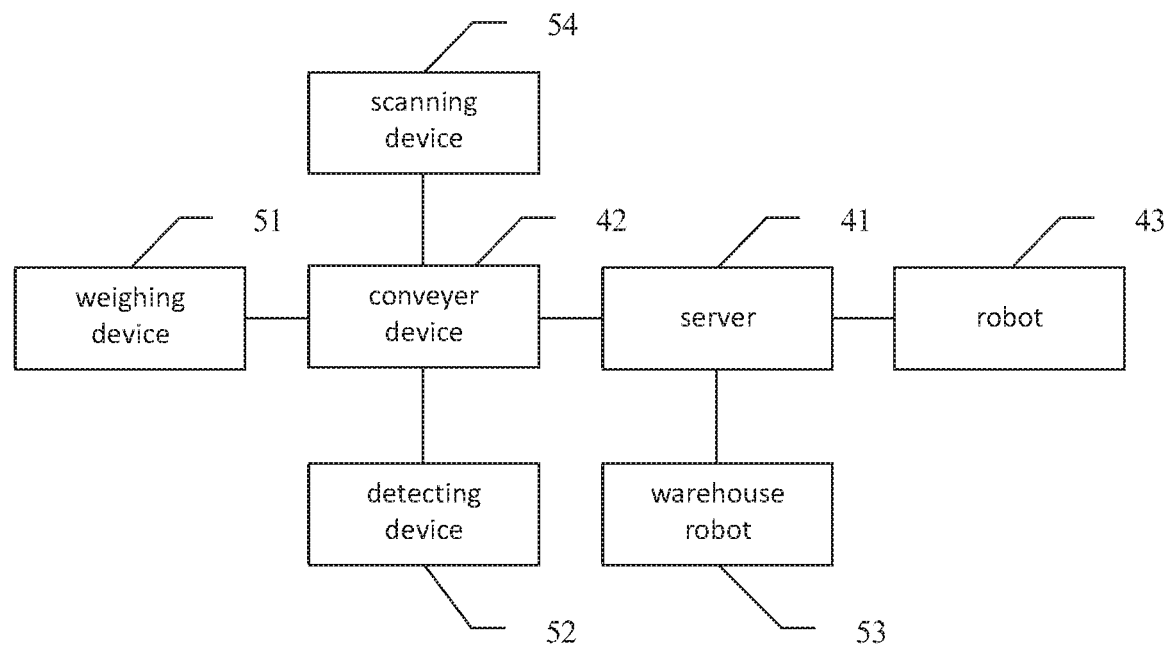
FIG. 6 is a schematic diagram showing a structure of a system of controlling a robot to stack goods according to a fifth embodiment of the invention.

Please refer to FIG. 6, which is a schematic diagram showing a structure of a system of controlling a robot to stack goods according to a fifth embodiment of the invention. The present system is different from the system of the fourth embodiment shown in FIG. 5 in the following features.

Further, the present system includes a weighing device 51 and/or a detecting device 52.

The weighing device 51 is configured to acquire a weight data of the goods. The detecting device 52 is configured to acquire any one or more combination of an on-site data in a compartment, a spatial data of a loading space, and a spatial data of the goods to be unloaded.

As shown in FIG. 6, the weighing device 51 and the detecting device 52 are disposed on the conveyer device 42. Optionally, the weighing device 51 and the detecting device 52 can be disposed on the end effector of the robot 43 as well.

The weighing device 51 and the detecting device 52 are configured to transmit the acquired data to the conveyer device 42, the robot 43, or the server 41.

When the weighing device 51 and the detecting device 52 are disposed on the conveyer device 42, the conveyer device 42 is further configured to obtain an attribute data of the goods based on the data acquired by the weighing device 51 and the detecting device 52 and transmit the attribute data to the robot 43 and/or the server 41.

Further, the server 41 is used to search for the attribute data of the goods based on the identification of the goods and return the attribute data back to the robot 43.

Further, the server 41 is used to search for the attribute data of the goods based on the identification of the goods, and obtain the target pose of the goods based on the attribute data of the goods and the on-site data in the compartment, the spatial data of the loading space in the compartment, or the spatial data of the goods to be unloaded transmitted by the detecting device 52, and transmit the target pose to the robot 43.

Further, the server 41 is configured to acquire all the attribute data of the goods and transmit the data to the robot 43. For example, all the attribute data of the goods are acquired from a logistic platform.

Further, the system includes a warehouse robot 53. One end of the conveyer device 42 is disposed at an exit of a warehouse and the other end of the conveyer device 42 is disposed at an entrance of the compartment. The warehouse robot 53 is configured to carry the goods stored in the warehouse onto the conveyer device 42 and acquire the attribute data of the goods to be moved and transmit the attribute data to the server 41.

The server 41 is further configured to obtain the target pose of the goods to be moved based on the attribute data of the goods to be moved and the on-site data in the compartment returned from the robot or the detecting device in the compartment, and transmit the target pose to the robot 43.

Before moving the goods, the warehouse robot 53 is further configured to generate a tag comprising the target pose of the goods to be moved transmitted by the server 41 and place the tag onto the goods to be moved. In the present embodiment, the goods to be moved are the goods waited to be moved to the compartment or to the warehouse. The goods to be moved are different from the goods that are required to move. The goods that are required to move are the ones that must be moved, such as all the goods that need to be unloaded from the compartment.

Further, the system includes a scanning device 54. As shown in FIG. 6, the scanning device 54 is disposed on the conveyer device 42. Alternatively, the scanning device 54 can be disposed on the end effector of the robot 43.

When the scanning device 54 is disposed on the conveyer device 42, the conveyer device 42 is further configured to scan the tag of the goods via the scanning device 54 to obtain the attribute data of the goods or the identification of the goods associated with the tag, and transmit to the robot 43.

Further, the server 41 is configured to transmit a serial number of the target pose of multiple goods to the robot 43 according to a stacking order.

Other technical details of the present embodiment can refer to the methods as described in the first to the third embodiments of the invention.

In the present embodiment of the invention, the collision-free motion trajectory of the robot and/or the end effector of the robot is planned based on the current pose and the target pose of the goods. The goods are stacked into the target pose according to the collision-free motion trajectory. The process of fully automated stacking the goods can be realized in the scenario of logistically loading or unloading the goods, and the efficiency of loading or unloading the goods can be improved, and the labor cost can be reduced.

Figure 7:
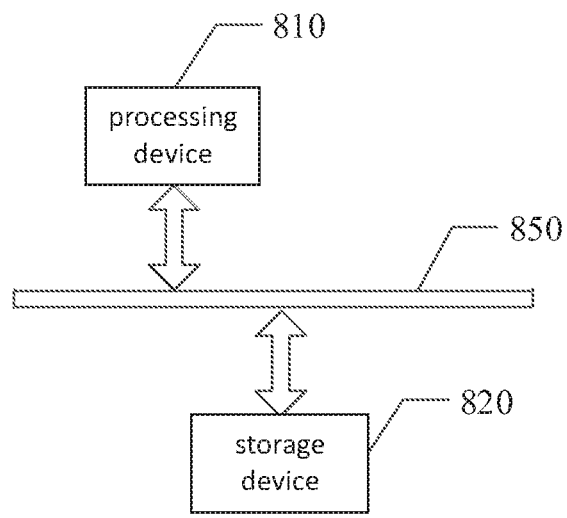
FIG. 7 is a schematic diagram showing a hardware structure of a robot of a sixth embodiment of the invention.

FIG. 7 is a schematic diagram showing a hardware structure of a robot of a sixth embodiment of the invention. The robot is configured to perform the methods of stacking the goods by the robot as described in the first to the third embodiments of the invention.

The robot of the present embodiment includes one or more processing device 810 and storage device 820. In FIG. 7, the robot is exemplified by including one processing device 810 and one storage device 820. The processing device 810 and the storage device 820 can be connected via a bus 850 or other communication methods. In FIG. 7, they are exemplified by connecting via the bus.

The storage device 820 is a non-transitory computer-readable storage medium and can be configured to store non-transitory software program, non-transitory computer executable program and module, such as the program instruction/module corresponding to the method of stacking the goods by the robot according to the first to the third embodiments of the invention. The processing device 810 controls the robot to perform each step in the above-mentioned first embodiment to the third embodiment via executing the non-transitory software program or the non-transitory computer executable program/module stored in the storage device 820, so as to realize the method of stacking the goods by the robot in the above-mentioned embodiments.

The storage device 820 can include a section for storing program and a section for storing data. The operating system or the application program required by at least one function can be stored in the section for storing program.

The section for storing data can be used to store data that is generated from operating the robot. In addition, the storage device 820 can include a high-speed random-access memory and a non-transitory memory, such as at least one disc storage device, flash memory device, or other non-transitory storage devices.

In some embodiments, the storage device 820 can optionally include a storage device which is remotely disposed relative to the processing device 810. The remote storage device can be connected to the robot via a network. Examples of the network include but not limited to internet, intranet, local area network, mobile communication network, and combinations thereof.

Further, the robot includes a moving mechanism, a sensor unit, a detecting device, a robotic arm, a main body, and a power source.

In which, several wheels are provided on the bottom of the moving mechanism. The robot can move in in various directions by means of driving the rotation of the wheels.

The sensor unit includes but not limited to a force and torque sensor, a visual sensor (e.g. a camera), an IR sensor, a proximity sensor, and a vacuum sensor.

The detecting device includes but not limited to a visual detecting device, a scanning device, and a weighing device. The detecting device is configured to obtain an on-site data in the compartment, a spatial data of a loading space, a spatial data of the goods to be unloaded, and an attribute data of the goods. The attribute data of the goods includes one or more combinations of volume, weight, color, shape, and pattern of the goods.

The end effector is attached to an end of the robotic arm. The robotic arm has six degrees of freedom, and a suction disc is attached to the end of the robotic arm to capture and hold the goods on the conveyer device.

The one or more processing device 810 and the storage device 820 are disposed in the main body.

Other technical details of the present embodiment can refer to the methods as described in the first and the second embodiments of the invention.

It is to be understood that according to the above-mentioned embodiments of the invention, the methods are described as combinations of a series of steps to simplify the description. However, it will be apparent to those who skilled in the art that the invention is not limited to the disclosed sequential orders of the steps, since some method steps can be performed in different orders or be performed simultaneously according to the present invention. It will also be apparent to those who skilled in the art that the embodiments in the disclosure are preferred embodiments, the steps and modules involved therein are not all necessarily required by the present invention.

In the above-mentioned embodiments of the invention, each embodiment focuses on certain technical features, and the part that is not detailed in one embodiment can be referred to the related descriptions of other embodiments.

It will be apparent to those who skilled in the art that various modifications and variations can be made to the method, the system, and the robot provided in the foregoing embodiments of the invention based on the scope or spirit of the invention. The scope of the invention should not be interpreted as limited by the disclosure of the detailed description of the invention; on the contrary, it is intended that the scope of the invention is defined by the following claims and their equivalents.

What is claimed is:

1. A method of stacking goods by a robot, the method comprising the steps of:
   acquiring a current pose and a target pose of the goods, wherein the step of acquiring the target pose of the goods comprises:
      acquiring a serial number of the target poses of a plurality of the goods, wherein the serial number is transmitted by a server according to a stacking order;
      obtaining the target pose based on an attribute data of the goods and the corresponding serial number of the goods, wherein the attribute data comprises any one or more combination of volume, weight, color, shape and pattern of the goods;
   obtaining a collision-free motion trajectory of the robot and/or an end effector of the robot based on the current pose and the target pose of the goods;
   controlling the robot to place the goods in the target pose in accordance with the collision-free motion trajectory.

2. The method according to claim 1, wherein the step of acquiring the target pose of the goods comprises:
   acquiring an attribute data of the goods and obtaining a spatial data of a loading space in a compartment via a detecting device;
   obtaining the target pose based on the attribute data of the goods and the spatial data of the loading space, wherein the attribute data comprises any one or more combination of volume, weight, color, shape, and pattern of the goods.

3. The method according to claim 2, wherein the step of obtaining the spatial data of the loading space in the compartment via the detecting device comprises:
   obtaining the spatial data of the loading space based on an on-site data in the compartment transmitted by the detecting device; or
   receiving the spatial data of the loading space transmitted by the detecting device based on the detected on-site data in the compartment.

4. The method according to claim 2, wherein the step of acquiring the attribute data of the goods comprises:
   scanning a tag of the goods to get a data associated with the tag, wherein the data associated with the tag comprises an identification of the goods;
   searching for the attribute data corresponding to the identification of the goods via a server.

5. The method according to claim 2, wherein the steps of acquiring the attribute data of the goods comprises:

scanning a tag of the goods to get a data associated with the tag, wherein the data associated with the tag comprises an identification of the goods;

searching for the attribute data corresponding to the identification of the goods from all the attribute data of the goods.

6. The method according to claim 5, further comprising: acquiring all the attribute data of the goods from a server and then storing the all the attribute data of the goods.

7. The method according to claim 2, wherein the attribute data is obtained via a data acquired via a weighing device and/or the detecting device.

8. The method according to claim 1, wherein the step of acquiring the target pose of the goods comprises:

obtaining a spatial data of the goods to be unloaded that are in a compartment via a detecting device;

obtaining an attribute data of the goods based on the spatial data of the goods to be unloaded;

obtaining the target pose based on the attribute data of the goods and the spatial data of the goods to be unloaded, wherein the attribute data comprises any one or more combination of volume, weight, color, shape, and pattern of the goods.

9. The method according to claim 8, wherein the step of obtaining the spatial data of the goods to be unloaded that are in the compartment via the detecting device comprises:

obtaining the spatial data of the goods to be unloaded based on an on-site data in the compartment transmitted by the detecting device; or receiving the spatial data of the goods to be unloaded transmitted by the detecting device based on the detected on-site data in the compartment.

10. The method according to claim 8, wherein the attribute data is obtained via a data acquired via a weighing device and/or the detecting device.

11. The method according to claim 1, wherein the step of obtaining the collision-free motion trajectory of the robot and/or the end effector of the robot based on the current pose and the target pose of the goods comprises:

obtaining the collision-free motion trajectory based on the current pose and the target pose of the goods and a data of obstacles around.

12. A robot, comprising: a storage device, a processing device, and a computer program stored in the storage device and executable by the processing device, wherein the computer program is executable by the processing device to perform the method of stacking goods by the robot according to claim 1.

13. The robot according to claim 12, further comprising a detecting device for obtaining an on-site data in a compartment, a spatial data of a loading space, and a spatial data of the goods to be unloaded.

14. A system of controlling a robot to stack goods, the system comprising:

a server configured to send a scheduling instruction to the robot;

a conveyer device configured to convey the goods;

the robot configured to perform each step of stacking the goods by the robot according to claim 1;

wherein the server is further configured to transmit a serial number of the target locations of the goods to the robot according to a stacking order.

15. The system according to claim 14, further comprising:

a weighing device configured to acquire a weight data of the goods; and/or a detecting device configured to acquire any one or more combination of an on-site data in a compartment, a spatial data of a loading space, and a spatial data of the goods to be unloaded;

wherein the weighing device and/or the detecting device is disposed on the conveyer device or on the end effector of the robot for transmitting the acquired data to the conveyer device, the robot, or the server;

wherein when the weighing device and/or the detecting device is disposed on the conveyer device, the conveyer device is configured to obtain an attribute data of the goods based on the acquired data of the weighing device and/or the detecting device and transmit the attribute data to the robot.

16. The system according to claim 15, wherein the server is further configured to search for the attribute data of the goods based on an identification of the goods, and obtain the target pose of the goods based on the attribute data of the goods and the on-site data in the compartment or the spatial data of the loading space in the compartment transmitted by the detecting device, and transmit the target pose to the robot.

17. The system according to claim 15, wherein one end of the conveyer device is disposed at an exit of a warehouse and the other end of the conveyer device is disposed at an entrance of the compartment, and the system further comprises:

a warehouse robot for carrying the goods stored in the warehouse onto the conveyer device and for acquiring the attribute data of the goods to be moved and transmitting the attribute data to the server;

wherein the server is further configured to obtain the target pose of the goods to be moved based on the attribute data of the goods to be moved and the on-site data in the compartment transmitted by the robot or by the detecting device in the compartment, and transmit the target pose to the robot;

wherein the warehouse robot is further configured to generate a tag comprising the target pose transmitted by the server and place the tag onto the goods to be moved.

18. The system according to claim 14, wherein the server is configured to search for an attribute data of the goods corresponding to an identification of the goods and return the attribute data to the robot.

19. The system according to claim 14, wherein the server is configured to transmit all the attribute data of the goods to the robot.

20. The system according to claim 14, further comprising:

a scanning device disposed on the conveyer device or the end effector of the robot;

wherein when the scanning device is disposed on the conveyer device, the conveyer device is further configured to scan a tag of the goods via the scanning device to get an attribute data of the goods associated with the tag or an identification of the goods, and transmit the attribute data or the identification to the robot.

* * * * *